US011401832B2

(12) United States Patent
Schwendenmann et al.

(10) Patent No.: US 11,401,832 B2
(45) Date of Patent: Aug. 2, 2022

(54) GAS TURBINE ENGINE INCLUDING SEAL PLATE WITH SEPARABLE TABS (71) Applicant: Raytheon Technologies Corporation, Farmington, CT (US)

(72) Inventors: Andrew V. Schwendenmann, Hampden, MA (US); Joseph B. Phelps, Vernon, CT (US); Sean P. McGee, Andover, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/141,432

(22) Filed: Jan. 5, 2021

(65) Prior Publication Data
US 2022/0213840 A1 Jul. 7, 2022

(51) Int. Cl.
*F01D 25/18* (2006.01)
*F16J 15/34* (2006.01)

(52) U.S. Cl.
CPC ........ *F01D 25/183* (2013.01); *F05D 2220/32* (2013.01); *F05D 2240/50* (2013.01); *F05D 2240/55* (2013.01); *F05D 2260/80* (2013.01); *F16J 15/3492* (2013.01)

(58) Field of Classification Search
CPC ...... F01D 25/183; F05D 2260/80; F02C 7/06; F02C 7/28; F16D 66/02; F16D 66/022; F16D 66/026–028; F16J 15/34–38; F16J 15/3492
See application file for complete search history.

(56) References Cited

U.S. PATENT DOCUMENTS

| | | | |
|---|---|---|---|
| 2,984,505 A * | 5/1961 | Andresen | F16J 15/36 277/388 |
| 4,424,973 A | 1/1984 | Heilala | |
| 6,073,358 A | 6/2000 | Nguyen | |
| 6,113,482 A | 9/2000 | Licata | |
| 7,837,199 B2 * | 11/2010 | Craig | F01D 11/003 277/377 |
| 8,864,446 B2 | 10/2014 | Singh et al. | |
| 10,180,075 B1 | 1/2019 | Andrus et al. | |
| 11,293,351 B2 * | 4/2022 | Wusatowska-Sarnek | F01D 11/003 |
| 2009/0014245 A1 * | 1/2009 | Shevchenko | G01N 33/2858 184/6.4 |
| 2015/0176425 A1 | 6/2015 | Caulfeild et al. | |

(Continued)

FOREIGN PATENT DOCUMENTS

DE 102017130965 A1 6/2019
GB 2401409 A 11/2004

*Primary Examiner* — Topaz L. Elliott
(74) *Attorney, Agent, or Firm* — Carlson, Gaskey & Olds, P.C.

(57) ABSTRACT

A gas turbine engine according to an exemplary aspect of the present disclosure includes, among other things, a compressor section, a combustor section, a turbine section, and at least one rotatable shaft. The engine further includes a seal assembly having a seal plate mounted for rotation with the rotatable shaft, a face seal in contact with the seal plate at a contact area, and a seal carrier supporting the face seal. Further, in normal operating conditions, the seal plate includes a plurality of tabs configured to separate from a remainder of the seal plate in a worn seal condition in which the seal carrier contacts the seal plate.

18 Claims, 8 Drawing Sheets (56) References Cited

U.S. PATENT DOCUMENTS

| | | |
|---|---|---|
| 2015/0275761 A1* | 10/2015 | Duffy .................... F01D 25/125 60/805 |
| 2016/0178064 A1 | 6/2016 | Vatovec et al. |
| 2019/0040959 A1 | 2/2019 | Sommers |
| 2020/0264157 A1 | 8/2020 | Rocco et al. |
| 2022/0018289 A1* | 1/2022 | Wusatowska-Sarnek ................... F01D 11/003 |

* cited by examiner

GAS TURBINE ENGINE INCLUDING SEAL PLATE WITH SEPARABLE TABS

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. These bearings along with other mechanical components, such as seals, are contained within oil-wetted bearing compartments. During operation of the engine, non-rotating seal faces contact rotating seal plates to maintain bearing compartment pressures and keep lubricating oil inside the various bearing compartments.

SUMMARY

A gas turbine engine according to an exemplary aspect of the present disclosure includes, among other things, a compressor section, a combustor section, a turbine section, and at least one rotatable shaft. The engine further includes a seal assembly having a seal plate mounted for rotation with the rotatable shaft, a face seal in contact with the seal plate at a contact area, and a seal carrier supporting the face seal. Further, in normal operating conditions, the seal plate includes a plurality of tabs configured to separate from a remainder of the seal plate in a worn seal condition in which the seal carrier contacts the seal plate.

In a further non-limiting embodiment of the foregoing gas turbine engine, each of the tabs is connected to a support projecting from a main body of the seal plate.

In a further non-limiting embodiment of any of the foregoing gas turbine engines, the supports project from the main body at an incline such that the tabs are at least partially arranged on an opposite axial side of the contact area as the main body.

In a further non-limiting embodiment of any of the foregoing gas turbine engines, in the worn seal condition, the supports are configured to fracture to permit separation of the tabs from the remainder of the seal plate.

In a further non-limiting embodiment of any of the foregoing gas turbine engines, the supports project from the main body in a radial direction such that the tabs are arranged on the same axial side of the contact area as the main body.

In a further non-limiting embodiment of any of the foregoing gas turbine engines, in the worn seal condition, the supports are configured to wear to permit separation of the tabs from the remainder of the seal plate.

In a further non-limiting embodiment of any of the foregoing gas turbine engines, in the worn seal condition, the supports are configured to wear such that an axial dimension of the supports diminishes.

In a further non-limiting embodiment of any of the foregoing gas turbine engines, a geometry of the tabs is unique to the seal assembly.

In a further non-limiting embodiment of any of the foregoing gas turbine engines, the seal assembly is a first seal assembly of the gas turbine engine, the gas turbine engine includes a second seal assembly including a seal plate with a plurality of tabs configured to separate from the seal plate of the second seal assembly in a worn seal condition of the second seal assembly, and the tabs of the first seal assembly are of a different geometry than the tabs of the second seal assembly.

In a further non-limiting embodiment of any of the foregoing gas turbine engines, a sensor is configured to detect the presence of tabs in a lubrication system of the gas turbine engine and is further configured to determine whether the first or second seal assembly is experiencing a worn seal condition based on the geometry of the detected tabs.

In a further non-limiting embodiment of any of the foregoing gas turbine engines, in normal operating conditions, the seal carrier does not contact the seal plate.

In a further non-limiting embodiment of any of the foregoing gas turbine engines, the engine includes a bearing assembly mounted relative to the rotatable shaft, and the seal assembly is adjacent the bearing assembly.

In a further non-limiting embodiment of any of the foregoing gas turbine engines, the face seal is made of a carbon material.

A bearing compartment for a gas turbine engine according to an exemplary aspect of the present disclosure includes, among other things, a bearing assembly and a seal assembly. The seal assembly includes a seal plate, a face seal in contact with the seal plate at a contact area, and a seal carrier supporting the face seal. Further, in normal operating conditions, the seal plate includes a plurality of tabs configured to separate from a remainder of the seal plate in a worn seal condition in which the seal carrier contacts the seal plate.

In a further non-limiting embodiment of the foregoing bearing compartment, each of the tabs is connected to a support projecting from a main body of the seal plate.

In a further non-limiting embodiment of any of the foregoing bearing compartments, the supports project from the main body at an incline such that the tabs are at least partially arranged on an opposite axial side of the contact area as the main body.

In a further non-limiting embodiment of any of the foregoing bearing compartments, in the worn seal condition, the supports are configured to fracture to permit separation of the tabs from the remainder of the seal plate.

In a further non-limiting embodiment of any of the foregoing bearing compartments, the supports project from the main body in a radial direction such that the tabs are arranged on the same axial side of the contact area as the main body.

In a further non-limiting embodiment of any of the foregoing bearing compartments, in the worn seal condition, the supports are configured to wear to permit separation of the tabs from the remainder of the seal plate.

In a further non-limiting embodiment of any of the foregoing bearing compartments, a geometry of the tabs is unique to the seal assembly.

BRIEF DESCRIPTION OF THE DRAWINGS

FIG. 3 illustrates an example seal plate including an example arrangement of separable tabs.

FIG. 7 illustrates the seal plate in a normal operating condition.

FIG. 8 illustrates the seal plate in a normal operating condition.

DETAILED DESCRIPTION

Figure 1:
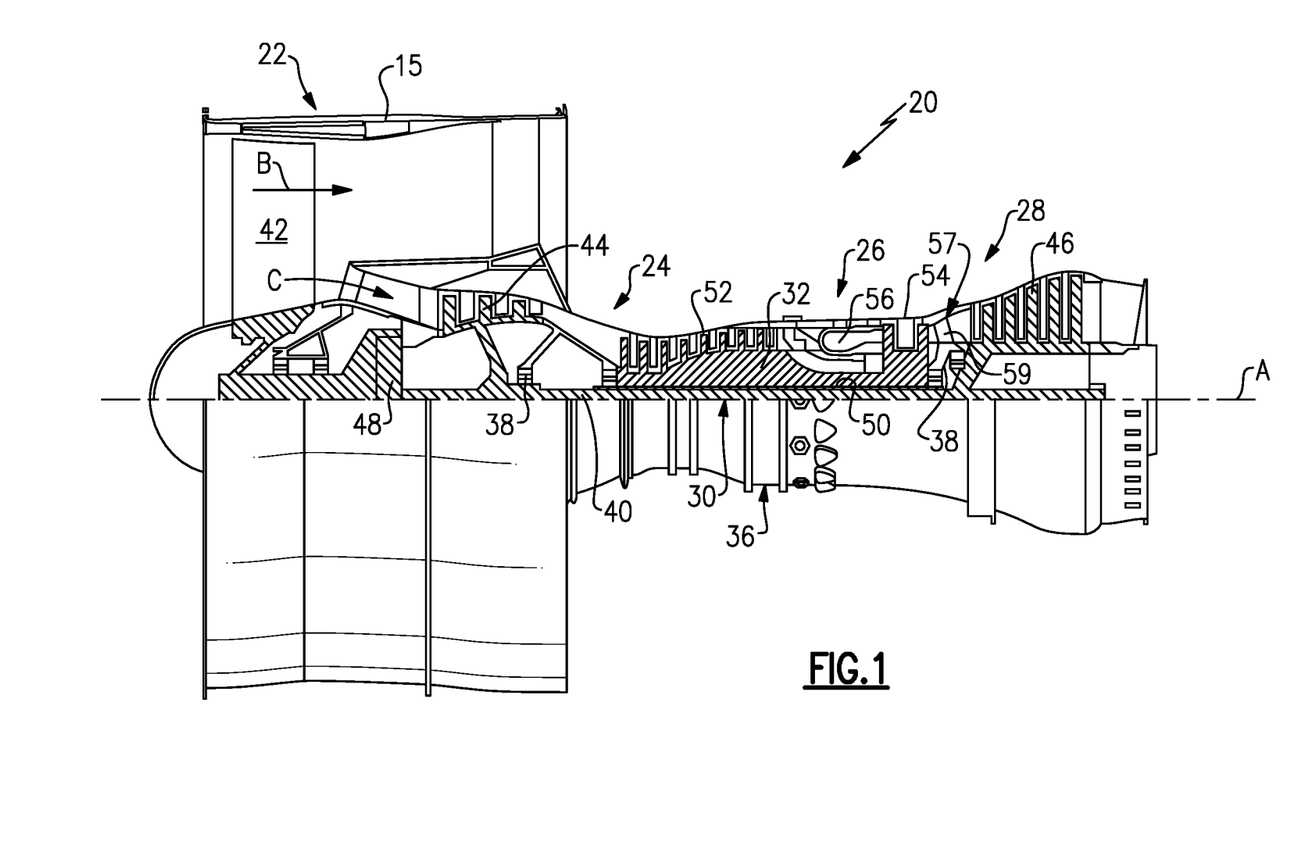
FIG. 1 schematically illustrates a gas turbine engine.

FIG. 1 schematically illustrates a gas turbine engine 20 ("engine 20"). The engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

Figure 2:
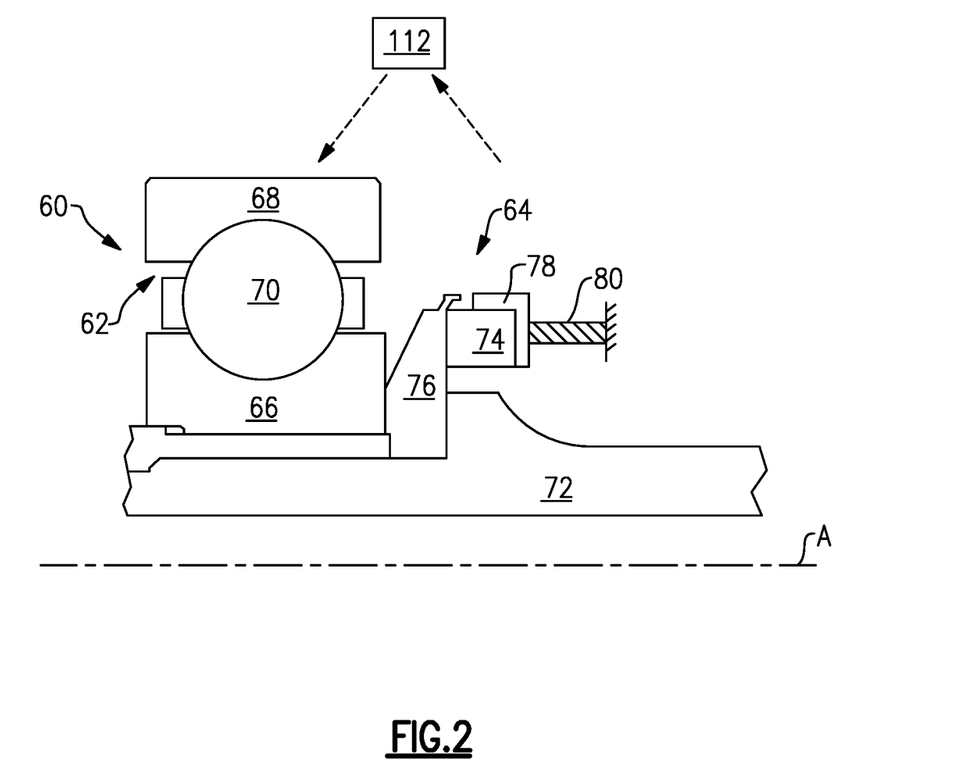
FIG. 2 illustrates a portion of the engine, and in particular illustrates a portion of a bearing compartment, including a bearing assembly and a seal assembly.

FIG. 2 is a partial cross-sectional view of a bearing compartment 60 of the engine 20. While described relative to the engine 20, this disclosure extends to other gas turbine engines other than the one shown in FIG. 1, and also extends to other rotation apparatuses such as power generators. The bearing compartment 60 includes a bearing assembly 62 and a seal assembly 64 adjacent the bearing assembly 62. As is known in the art, the bearing assembly 62 includes an inner race 66, an outer race 68, and rolling elements, such as balls, 70 configured to roll therebetween. The bearing assembly 62 is mounted relative to a shaft 72 of the engine 20.

The bearing compartment 60 is representative of any bearing compartment within the engine 20. Further, the shaft 72 is representative of any shaft within the engine 20, such as the inner shaft 40 or the outer shaft 50. This disclosure is not limited to bearing compartments at any particular engine location. Further, this disclosure applies outside the context of bearing compartments.

The seal assembly 64 includes a face seal 74 and a seal plate 76. In this example, the face seal 74 is mounted to a static structure, namely a seal carrier 78, and therefore does not rotate during operation of the engine 20. The face seal 74 may be made of a carbon (C) material, however other materials come within the scope of this disclosure.

The face seal 74 is biased against, and in direct contact with, the seal plate 76. In particular, either the seal carrier 78 itself is configured to bias the face seal 74 axially toward the seal plate 76, or another structure, such as a spring 80, biases the seal carrier 78, and in turn the face seal 74, axially toward the seal plate 76. The spring 80 may be a coil spring or a bellows spring, as examples.

The seal plate 76 is configured to rotate about the engine central longitudinal axis A with the shaft 72. The contact area, namely the region where the face seal 74 directly contacts the seal plate 76, between the face seal 74 and the seal plate 76 ensures that cooling fluid, namely lubricant such as oil, remains within the bearing compartment 60 during operation of the engine 20. Over time, the face seal 74 may wear. This disclosure relates to detection of such wear.

Figure 3:
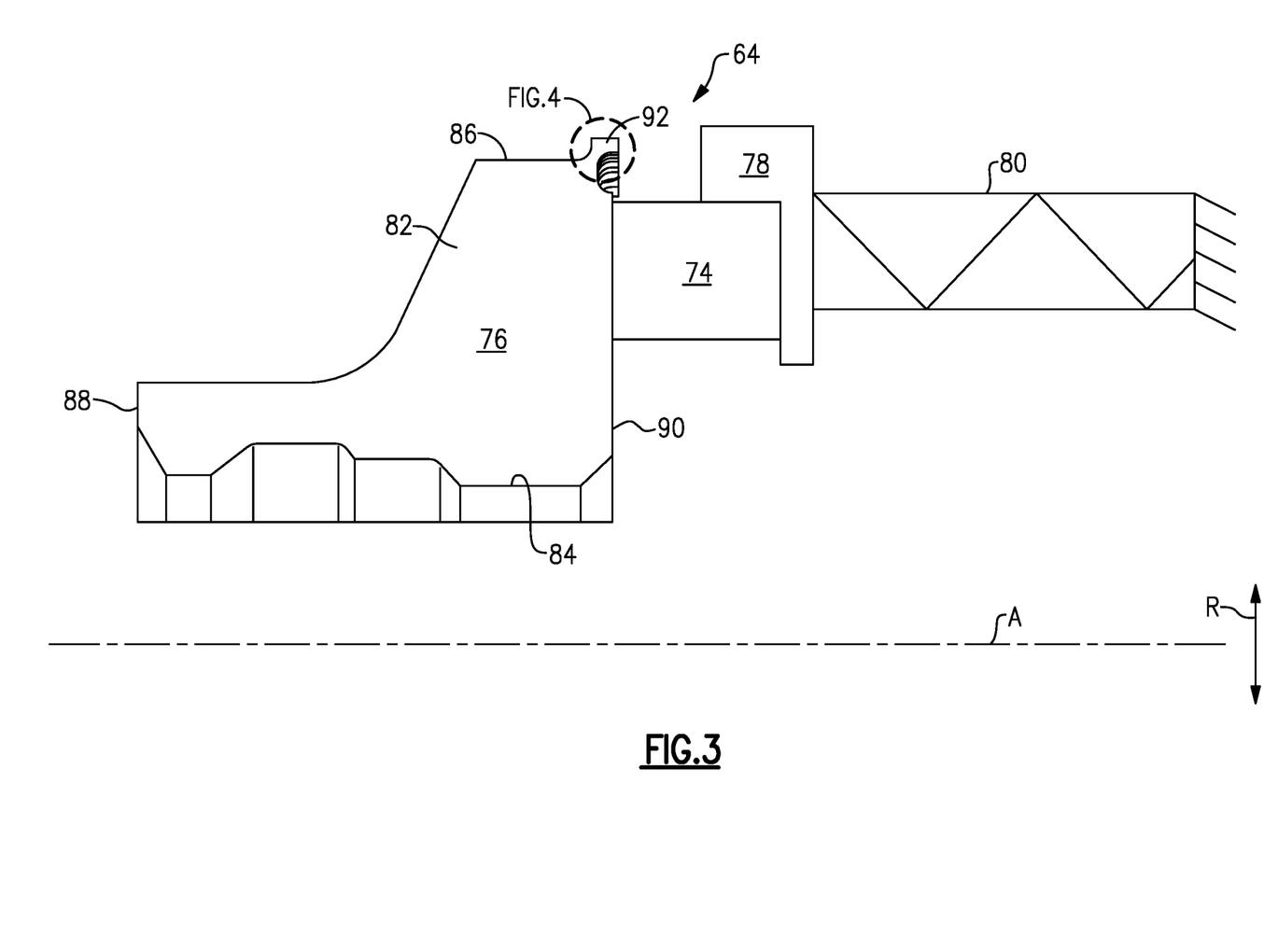
FIG. 3 is a close-up view of the portion of the engine, and in particular illustrates the seal assembly in a normal operating condition.

FIG. 3 illustrates the seal assembly 64 in more detail. In FIG. 3, the seal plate 76 includes a main body 82 extending radially in radial direction R from a radially inner surface 84 to a radially outer surface 86 and extending axially from a first axial end 88, which in FIG. 3 is a fore end, to a second axial end 90, which in FIG. 3 is an aft end. The terms "axially," "radially," and "circumferentially" in this disclosure are used with reference to the engine central longitudinal axis A. The second axial end 90 of the seal plate 76 contacts the face seal 74 at the contact area, which is radially between the radially inner and outer surfaces 84, 86.

Figure 6:
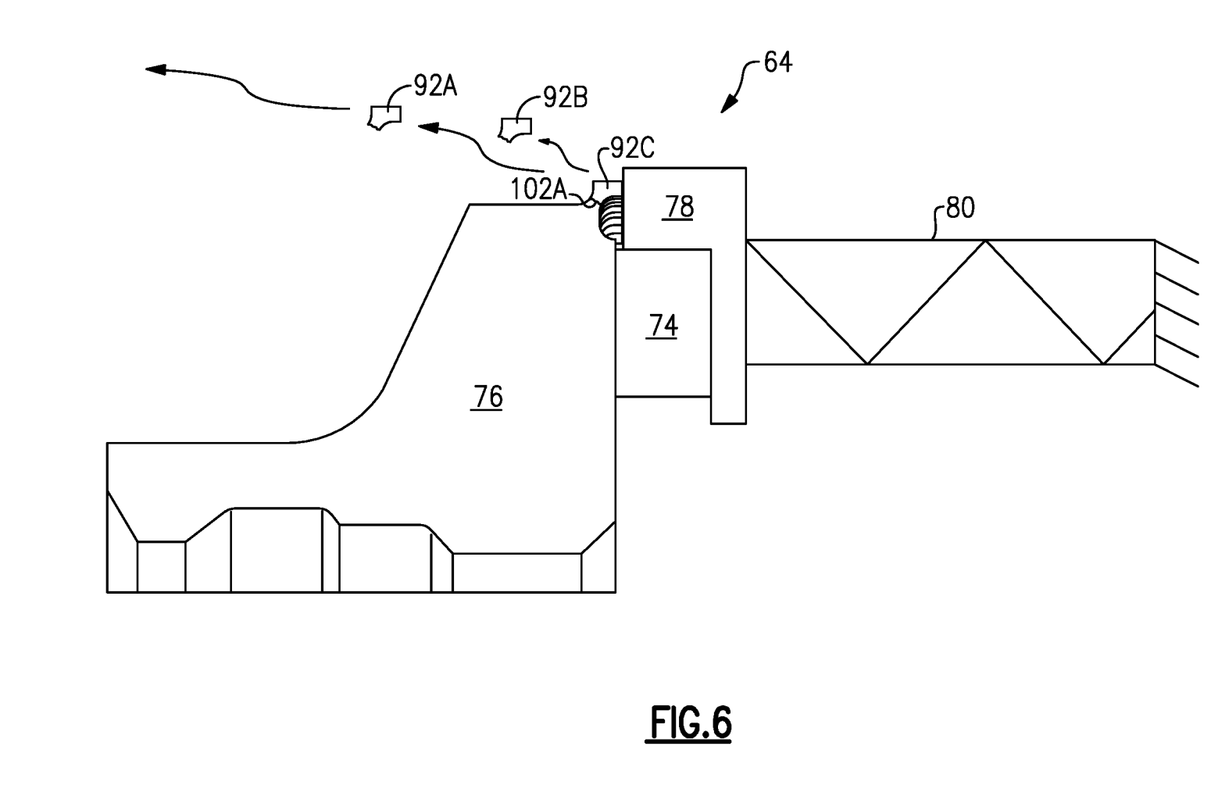
FIG. 6 is a close-up view of the portion of the engine, and in particular illustrates the seal assembly in a worn seal condition.

FIG. 3 illustrates the seal assembly 64 in a normal operating condition, in which the seal carrier 78 does not contact the seal plate 76 directly. Rather, in normal operating conditions, the seal plate 76 is spaced-apart from the seal carrier 78 by the face seal 74. The seal plate 76 includes a plurality of tabs 92 configured to separate from the remainder of the seal plate 76 in a worn seal condition. In this disclosure, a worn seal condition refers to conditions in which the face seal 74 has worn to the point where the seal carrier 78 contacts the seal plate 76, as shown in FIG. 6.

Figure 4:
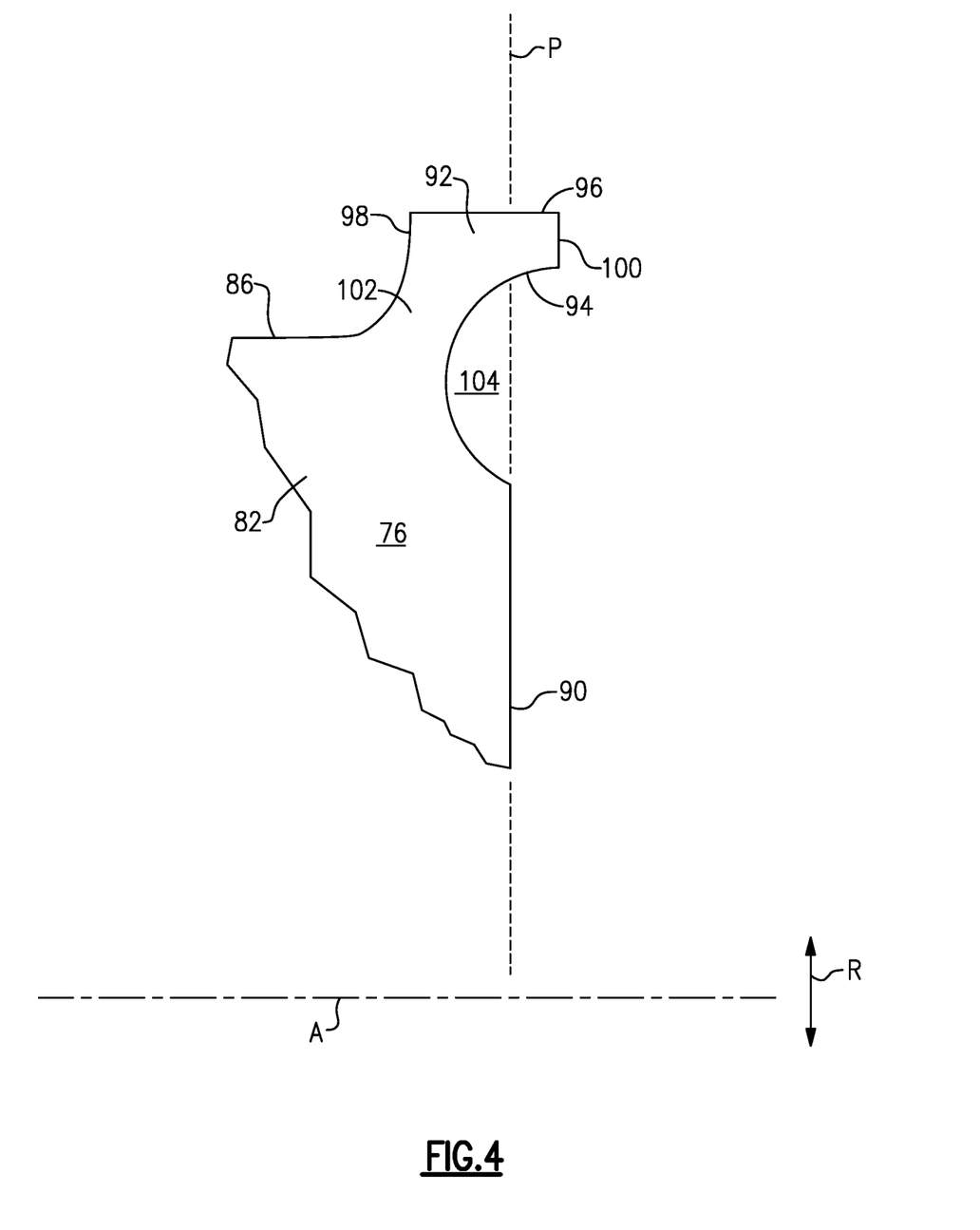
FIG. 4 is a close-up view of the corresponding encircled area of FIG. 3.
Figure 5:
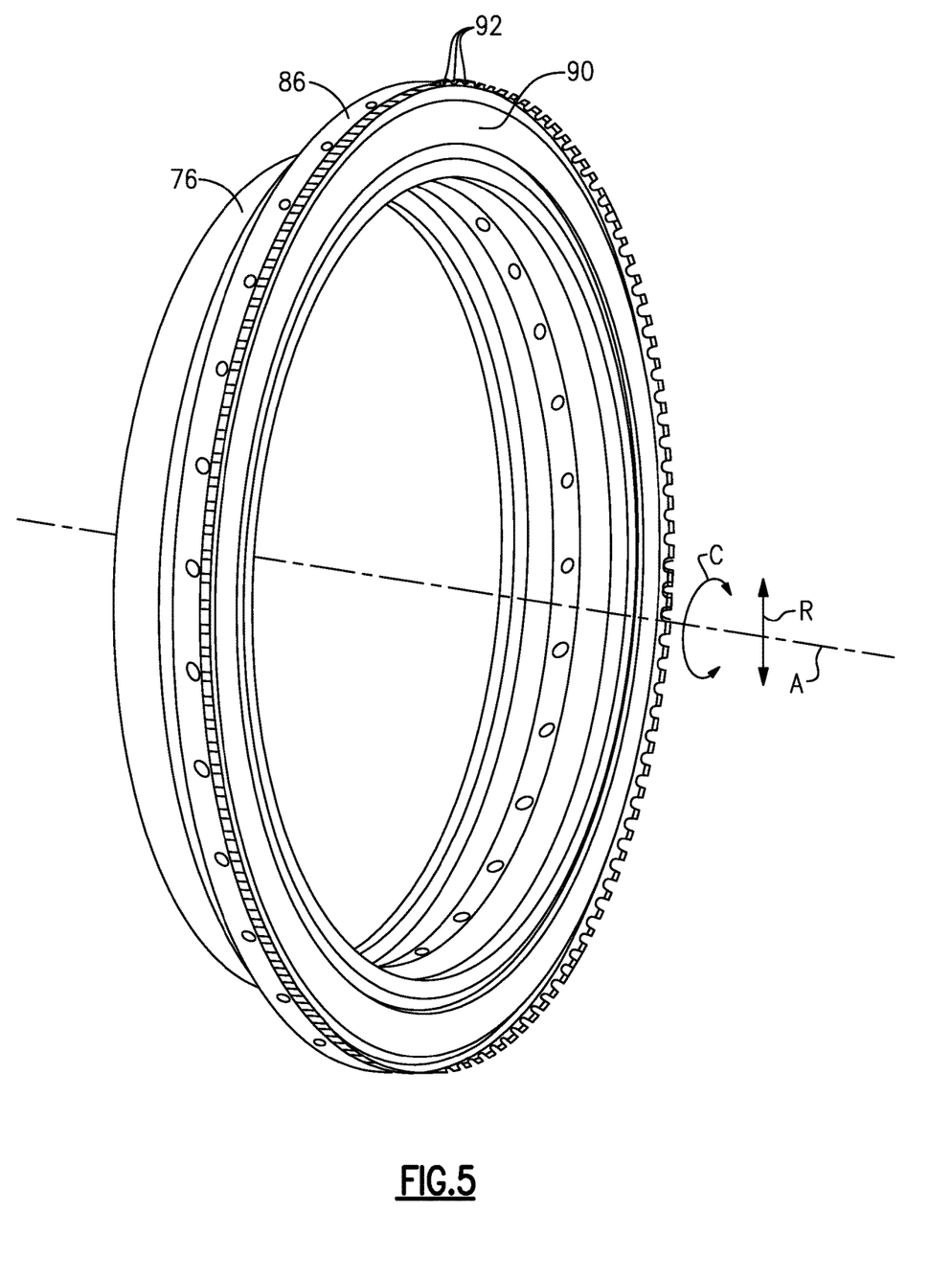
FIG. 5 is a perspective view of the seal plate of FIG. 3.

FIG. 4 illustrates a tab 92 in more detail. While only one tab 92 is shown in FIG. 4, it should be understood that each of the tabs of the seal plate 76 is similarly, if not identically, arranged and exhibits that same, if not identical, geometry as the tab 92. For instance, with reference to FIG. 5, a plurality of tabs 92 are circumferentially spaced-apart from one another and arranged about the circumference of the seal plate 76.

The tab 92 is a relatively small strip of metallic material formed of the same material as the seal plate 76, in this example. The tab 92 is not a coating applied to the seal plate 76. Rather, the seal plate 76 is integrally formed with tab 92. In an example, the seal plate 76 is machined to formed the tab 92.

The tab 92 includes a radially inner surface 94, a radially outer surface 96, a first axial end 98, and a second axial end 100. The tab 92 is supported relative to the radially outer surface 86 of the main body 82 by a support 102 projecting from the main body 82. The main body 82 is the majority of the mass of the seal plate 76. The seal plate 76 includes one support 102 for each tab 92. The support 102 projects from the main body 82 at an incline, in this example, such that the support 102 exhibits both a radial and axial component and such that the tab 92 is partially arranged on an opposite axial side of the contact area as the main body 82. A radially-extending plane P containing the contact area is shown in FIG. 4 for reference. As shown, the second axial end 100 of the tab 92 is on the opposite side of the plane P as the main body 82. In some examples, the tab 92 is fully on the opposite side of the plane P as the main body 82. The support 102 is also configured such that the tab 92 is at least partially radially aligned with the seal carrier 78 such that, in a worn seal condition, the tab 92 will contact the seal carrier 78. In particular, because of the arrangement of the support 102, the second axial end 100 of the tab 92 will contact the seal carrier 78 before the seal carrier 78 contacts the second axial end 90 of the main body 82.

The support 102 is formed, in an example, by machining a groove 104 radially inward of the tab 92. The groove 104 is arcuate in this example. The support 102 may exhibit a reduced dimension, in both the axial direction and the circumferential direction C, than the tab 92. The support 102 is frangible and is configured to fracture in a worn seal condition at a radial location between radially outer surface 86 and the tab 92 in response to torque applied to the tabs 92 by the seal carrier 78.

FIG. 6 is representative of a worn seal condition. In a worn seal condition, one or more of the tabs 92 can become separated from the seal plate 76. In some examples, all or substantially all of the tabs 92 are separated. In FIG. 6, the face seal 74 has worn to the point where the seal carrier 78 contacts at least some of the tabs 92. As the seal carrier 78 contacts the second axial end 100 of a tab 92, the seal carrier 78 applies torque to the tab 92 and the corresponding support 102. The corresponding support 102 is configured to fracture in response to this applied torque.

In FIG. 6, two tabs 92A, 92B have separated from a remainder of the seal plate 76. Specifically, in this example, in a normal operating condition, the tab 92A was connected to the seal plate 76 via a support 102A. As shown in FIG. 6, the support 102A has fractured such that only a portion of the support 102A remains attached to the seal plate 76 and such that the tab 92A is no longer connected to the seal plate 76.

Figure 7:
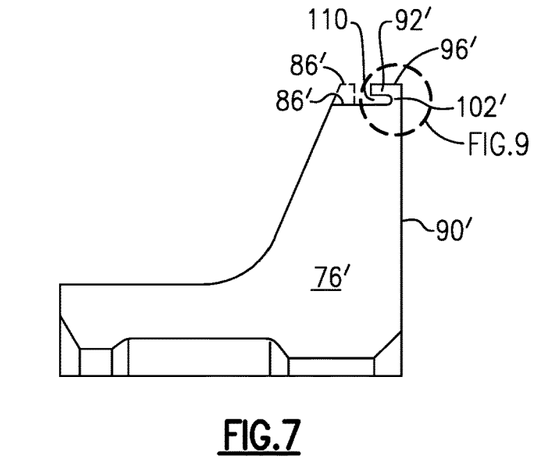
FIG. 7 is a view of another example seal plate including another arrangement of separable tabs.
Figure 8:
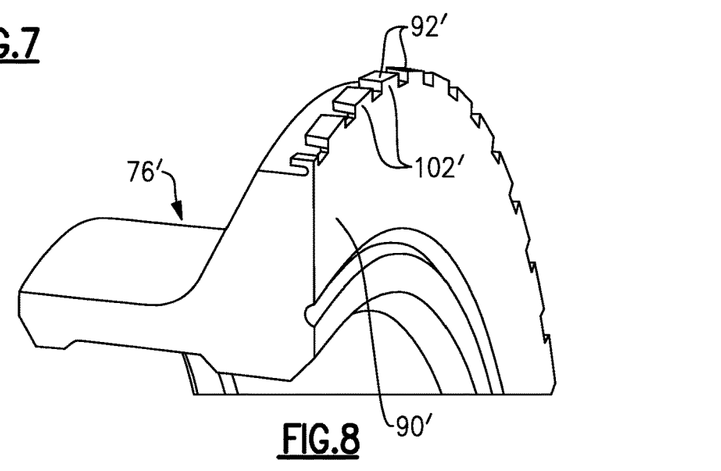
FIG. 8 is a perspective view of a portion of the seal plate of FIG. 7.

FIGS. 7 and 8 illustrate another arrangement of a seal plate 76' which is arranged similar to the seal plate 76 of FIGS. 3-6, and uses a "prime" designation to refer to like parts.

With joint reference to FIGS. 7 and 8, the tabs 92' are attached to the main body 82' of the seal plate 76' by way of supports 102' which project in a direction parallel to the radial direction R. In particular, the supports 102' are not inclined transverse to the radial direction R in the same manner as the supports 102.

Figure 9:
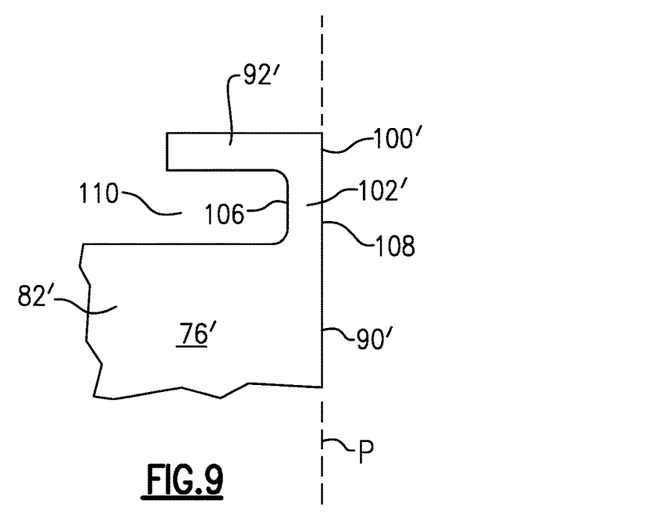
FIG. 9 is a close-up view of the corresponding encircled area of FIG. 7.

Rather, with reference to FIG. 9, the tab 92' is arranged such that the second axial end 100' of the tab 92' is co-planar with the second axial end 90' of the main body 82'. Further, the support 102' has an axial dimension between a first axial end 106 and a second axial end 108. The second axial end 108 is co-planar with the second axial end 90' and the second axial end 100'. The first axial end 106 is axially spaced-apart from the second axial end 108 such that the axial dimension of the support 102' is less than half of an axial dimension of the tab 92'.

A radially-extending plane P containing the contact area is shown in FIG. 9. The arrangement of the tab 92' and the support 102' is such that the entirety of the tab 92' is on the same axial side of the plane P as the main body 82' of the seal plate 76. In this manner, the tab 92' and the support 102' may be formed by creating a channel 110 in the seal plate 76. The channel 110 may be machined into the seal plate 76. Alternatively, the arrangement of the tabs 92' and the support 102' may be formed using an additive manufacturing process. In this regard, the entire seal plate 76 may be additively manufactured. In some embodiments, the radially outer surface 86' may be radially inward of the tabs 92' and the supports 102' or, alternatively, may be at least partially radially aligned with the tabs 92' and/or the supports 102'. In FIG. 7, the dashed line is representative of an embodiment in which the radially outer surface 86' is radially aligned with the radially outer surface 96' of the tabs 92'. In that instance, the groove 110 may be most easily formed using additive manufacturing techniques.

Figure 10:
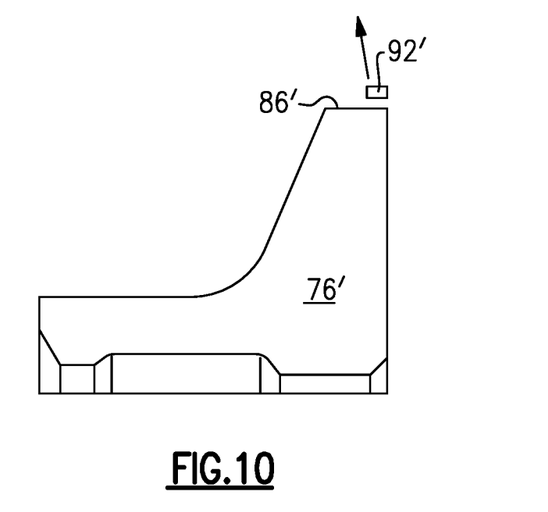
FIG. 10 is a view of the example seal plate of FIG. 7 in a worn seal condition.
Figure 11:
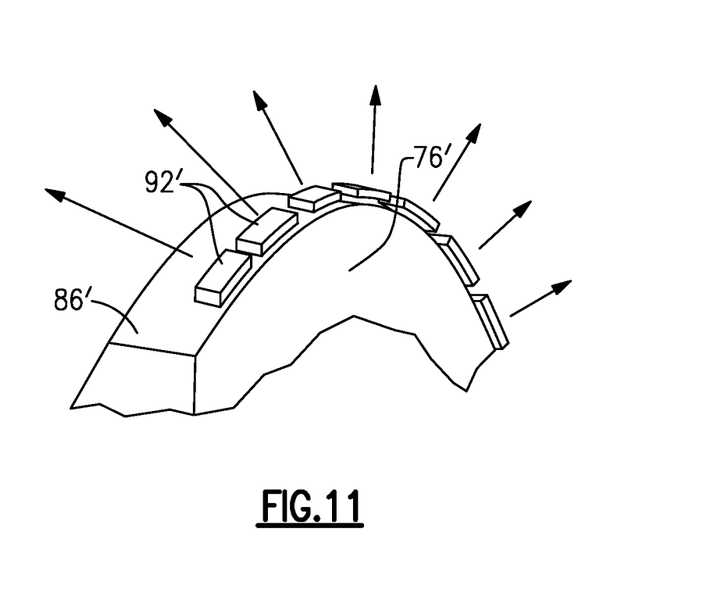
FIG. 11 is a perspective view of a portion of the seal plate of FIG. 7 in a worn seal condition.

FIGS. 10 and 11 are views of the seal plate 76' similar to FIGS. 7 and 8, but illustrate the seal plate 76' in a worn seal condition. In this condition, the face seal 74 has worn down to the point where the seal carrier 78 contacts the seal plate 76'. Specifically, seal carrier 78 contacts the seal plate 76' at locations radially aligned with the supports 102'. As represented in FIGS. 10 and 11, the supports 102' have been worn down fully by way of contact with the seal carrier 78 and, as such, the tabs 92' have separated from the remainder of the seal plate 76'. Specifically, the seal carrier 78 initially contacts the supports 102' at the second axial end 108 and has worn through the supports 102' toward the first axial end 106 to the point where the support 102' has fully diminished or has diminished to the point where the support 102' can no longer hold the tab 92' to the remainder of the seal plate 76'.

The tabs 92, 92' exhibit a geometry such that, if the tabs 92, 92' become separated from the corresponding seal plate, the tabs 92, 92' will be released into the bearing compartment 60 and carried through a lubrication system of the engine 20. The lubrication system is configured to distribute oil to various locations of the engine 20, including the bearing compartment 60. The tabs 92, 92' are of a geometry such that they flow through certain filters and/or screens in the lubrication system but not others, such that the tabs 92, 92' only flow to certain locations and are not permitted to flow to other locations. The tabs 92, 92' are also readily detected by a sensor 112 of the engine 20. An example sensor 112 is schematically illustrated in FIG. 2. The sensor 112 may be an in-line oil debris monitor (ODM), or any other type of sensor configured to detect magnetic or metallic particles in lubricant. The sensor 112 may be in communication with or may include a controller, which includes software, hardware, and the like, to perform the functionality discussed herein.

In general, when the sensor 112 detects tabs 92, 92' in the lubrication system, the sensor 112 identifies a worn seal condition. The sensor 112 may issue a corresponding command or message which may be acted on automatically or manually.

In an aspect of this disclosure, the engine 20 includes a plurality of seal assemblies 64, each including seal plates with tabs configured to separate from the seal plate in a manner described above. In a particular aspect of the disclosure, a geometry of the tabs is unique to a particular seal assembly and, in turn, to a particular seal plate. For instance, the tabs of a seal plate corresponding to a bearing compartment at a forward engine location may be larger than the tabs associated with a seal plate corresponding to a bearing compartment at an aft engine location. Further, some bearing compartments may include more than one corresponding seal plate and, in that instance, each seal plate may include tabs of a unique geometry despite corresponding to the same bearing compartment. The sensor 112 is able to identify the location of the worn seal condition within the engine 20 by the geometry of the tabs, namely by the size and/or shape of the tabs. Similarly, the tabs may be made of a material unique to a particular seal plate, and, in this example, the sensor 112 is configured to identify the location of the worn seal condition based on the material of the detected tabs. In this way, a location of a worn seal condition can be determined with specificity.

It should be understood that terms such as "axial" and "radial" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms. Additionally, while many components of the engine 20 are shown in cross-section in the figures, it should be understood that certain of these components extend circumferentially around the engine central longitudinal axis A.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
   a compressor section, a combustor section, a turbine section, and a rotatable shaft; and
   a seal assembly including a seal plate mounted for rotation with the rotatable shaft, a face seal in contact with the seal plate at a contact area, and a seal carrier supporting the face seal, wherein, in normal operating conditions, the seal plate includes a plurality of tabs configured to separate from a remainder of the seal plate in a worn seal condition in which the seal carrier contacts the seal plate, wherein each of the tabs is connected to a support projecting from a main body of the seal plate.

2. The gas turbine engine as recited in claim 1, wherein the supports project from the main body at an incline such that the tabs are at least partially arranged on an opposite axial side of the contact area as the main body.

3. The gas turbine engine as recited in claim 2, wherein, in the worn seal condition, the supports are configured to fracture to permit separation of the tabs from the remainder of the seal plate.

4. The gas turbine engine as recited in claim 1, wherein the supports project from the main body in a radial direction such that the tabs are arranged on the same axial side of the contact area as the main body.

5. The gas turbine engine as recited in claim 4, wherein, in the worn seal condition, the supports are configured to wear to permit separation of the tabs from the remainder of the seal plate.

6. The gas turbine engine as recited in claim 5, wherein, in the worn seal condition, the supports are configured to wear such that an axial dimension of the supports diminishes.

7. The gas turbine engine as recited in claim 1, wherein, in normal operating conditions, the seal carrier does not contact the seal plate.

8. The gas turbine engine as recited in claim 1, further comprising:
   a bearing assembly mounted relative to the rotatable shaft, wherein the seal assembly is adjacent the bearing assembly.

9. The gas turbine engine as recited in claim 1, wherein the face seal is made of a carbon material.

10. A gas turbine engine, comprising:
    a compressor section, a combustor section, a turbine section, and a rotatable shaft; and a seal assembly including a seal plate mounted for rotation with the rotatable shaft, a face seal in contact with the seal plate at a contact area, and a seal carrier supporting the face seal, wherein, in normal operating conditions, the seal plate includes a plurality of tabs configured to separate from a remainder of the seal plate in a worn seal condition in which the seal carrier contacts the seal plate, wherein a geometry of the tabs is unique to the seal assembly.

11. The gas turbine engine as recited in claim 10, wherein:
the seal assembly is a first seal assembly of the gas turbine engine,
the gas turbine engine includes a second seal assembly including a seal plate with a plurality of tabs configured to separate from the seal plate of the second seal assembly in a worn seal condition of the second seal assembly, and
the tabs of the first seal assembly are of a different geometry than the tabs of the second seal assembly.

12. The gas turbine engine as recited in claim 11, wherein:
a sensor is configured to detect the presence of tabs in a lubrication system of the gas turbine engine and is further configured to determine whether the first or second seal assembly is experiencing a worn seal condition based on the geometry of the detected tabs.

13. A bearing compartment for a gas turbine engine, comprising:
a bearing assembly; and
a seal assembly including a seal plate, a face seal in contact with the seal plate at a contact area, and a seal carrier supporting the face seal, wherein, in normal operating conditions, the seal plate includes a plurality of tabs configured to separate from a remainder of the seal plate in a worn seal condition in which the seal carrier contacts the seal plate, wherein each of the tabs is connected to a support projecting from a main body of the seal plate.

14. The bearing compartment as recited in claim 13, wherein the supports project from the main body at an incline such that the tabs are at least partially arranged on an opposite axial side of the contact area as the main body.

15. The bearing compartment as recited in claim 14, wherein, in the worn seal condition, the supports are configured to fracture to permit separation of the tabs from the remainder of the seal plate.

16. The bearing compartment as recited in claim 13, wherein the supports project from the main body in a radial direction such that the tabs are arranged on the same axial side of the contact area as the main body.

17. The bearing compartment as recited in claim 13, wherein, in the worn seal condition, the supports are configured to wear to permit separation of the tabs from the remainder of the seal plate.

18. The bearing compartment as recited in claim 13, wherein a geometry of the tabs is unique to the seal assembly.

\* \* \* \* \*